W. Wright,
Upholstering Spring,
№ 16,254. Patented Dec. 16, 1856.

UNITED STATES PATENT OFFICE.

WENDELL WRIGHT, OF NEW YORK, N. Y.

MODE OF SECURING SPRINGS IN UPHOLSTERY.

Specification of Letters Patent No. 16,254, dated December 16, 1856.

*To all whom it may concern:*

Be it known that I, WENDELL WRIGHT, of the city, county, and State of New York, have invented a new and Improved Mode of Securing Upholstery-Springs to Their Seats; and I do hereby declare that the following is a full, clear, and exact description of the same, reference being had to the annexed drawings, making a part of this specification, in which—

Figure 1:
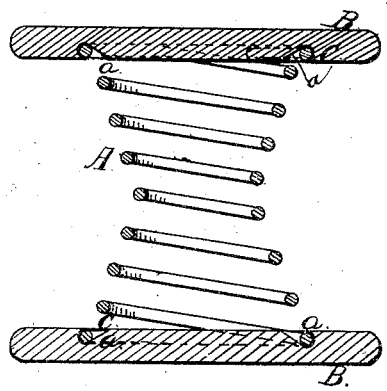
Figure 2:
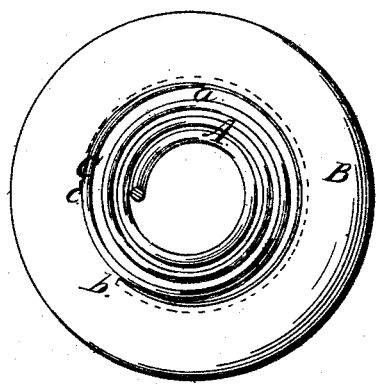

Figure 1, is a vertical section of a spring and its two seats, the spring being secured to the seats according to my improved mode. Fig. 2, is a horizontal section of a spring, the spring being bisected through its center.

Similar letters of reference indicate corresponding parts in the two figures.

My invention consists in having an annular groove made in each seat, and having the greater portion of each coil, at both ends of the spring, made perfectly horizontal, and somewhat larger in diameter than the grooves, so that said coils may be fitted in the grooves and be retained therein by their elasticity.

To enable those skilled in the art to fully understand and construct my invention, I will proceed to describe it.

A, represents a wire spring of the usual form employed for upholstery purposes.

B, B, are the two seats of the spring. Each seat has an annular groove $a$, made in it to receive the ends of the spring A.

The last coil C, at each end of the spring A, has about $\frac{3}{4}$ or $\frac{4}{5}$ of its length, more or less, made perfectly horizontal, as shown from $d$, to $c$, in Fig. 2, so that said coils will have a good bearing surface in the grooves $a$, and the coils C, are made somewhat larger in diameter than the grooves, so that when they are contracted and fitted in them, the elasticity of the coils will cause them to bind firmly in the grooves and consequently firmly secure the spring to the seats.

The above improvement is a valuable one. At present, the springs require guide pins and, in some cases, lateral springs or braces are employed to prevent the displacement of the springs from their seats. But by securing the springs to their seats as shown, they are retained in proper position, within a mattress cushion or seat and each spring is independent of the other, no special connection being required.

Having thus described my invention, what I claim as new and desire to secure by Letters Patent, is—

Securing the spring A, to its seats B, B, by having annular grooves $a$, made in the seats, one in each, and having the greater portion of the coils C, at the ends of the springs made or bent in horizontal form and somewhat larger in diameter than the grooves $a$, so that they will have a requisite bearing on the seats and be retained by their elasticity within the grooves as herein described.

WENDELL WRIGHT.

Witnesses:
WM. TUSCH,
JAMES F. BUCKLEY.